United States Patent [19]

Ikeo et al.

[11] Patent Number: 5,608,857
[45] Date of Patent: Mar. 4, 1997

[54] DOCUMENT PREPARATION SUPPORT SYSTEM USING KNOWLEDGE DATABASE TO DETERMINE DOCUMENT LAYOUT

[75] Inventors: Joji Ikeo; Tsuyoshi Tanaka, both of Yokohama, Japan

[73] Assignee: Fuji Xerox Co., Ltd., Japan

[21] Appl. No.: 580,492

[22] Filed: Dec. 29, 1995

Related U.S. Application Data

[63] Continuation of Ser. No. 499,010, Jul. 6, 1995, abandoned, which is a continuation of Ser. No. 955,835, Oct. 2, 1992, abandoned.

[30] Foreign Application Priority Data

Oct. 4, 1991 [JP] Japan .................. 3-258013

[51] Int. Cl.$^6$ .................................. G06F 13/00
[52] U.S. Cl. ........................... 395/761; 395/779
[58] Field of Search .................... 395/145, 150, 395/146, 148, 149, 50, 60, 62; 364/419.17

[56] References Cited

U.S. PATENT DOCUMENTS

| | | | |
|---|---|---|---|
| 4,700,317 | 10/1987 | Watanabe et al. | 395/51 |
| 4,813,010 | 3/1989 | Okamoto et al. | 395/600 |
| 4,837,712 | 6/1989 | Shibamiya | 395/150 |
| 4,876,665 | 10/1989 | Iwai et al. | 395/600 |
| 4,970,665 | 11/1990 | Doi et al. | 395/148 |
| 5,068,809 | 11/1991 | Verhelst et al. | 395/145 |
| 5,140,676 | 8/1992 | Langelaan | 395/145 |
| 5,278,952 | 1/1994 | Kira et al. | 395/145 |
| 5,302,969 | 4/1994 | Kuroda et al. | 395/145 |
| 5,379,373 | 1/1995 | Hayashi et al. | 395/148 |

FOREIGN PATENT DOCUMENTS

| | | |
|---|---|---|
| 62-229364 | 10/1987 | Japan . |
| 63-175965 | 7/1988 | Japan . |
| 1180062 | 7/1989 | Japan . |
| 1304575 | 12/1989 | Japan . |

OTHER PUBLICATIONS

L. Lamport, "Latex: A Document Preparation System," Addison–Wesley, 1985.

F. Hayer–Roth, et al., "Building Expert Systems," Addison–Wesley, 1983.

Fuji Xerox, "Presentation & Documentation," Compiled by Fuji Xerox, 1989.

"A Study on Evaluation Scales for Document Design Quality," reported in Proceedings of the 42nd General Meeting of the Information Processing Society of Japan, 1991.

WordPerfect for Windows, Version 5.1, WordPerfect Corporation, 1991 Program Release Date: Apr. 30, 1992.

*Primary Examiner*—Heather R. Herndon
*Assistant Examiner*—Stephen Hong
*Attorney, Agent, or Firm*—Welsh & Katz, Ltd.

[57] ABSTRACT

A document preparation support system which enables a document preparer to easily prepare a good-looking document meeting his purpose and application while eliminating the need for having any editorial design knowledge and which also enables the document preparer to easily prepare a document having a good result satisfying his intention and application even when the document preparer has no knowledge about how to reflect his intention and application on the document. To this end, in the document preparation support system, inferring operation is carried out with use of such document data as document contents and attributes and such document design knowledge data as evaluation words and document design elements to decide the optimum document design. Further, inferring operation is carried out with use of such document data as document contents and attributes and improper point indication data indicative of improper points in a document being prepared to indicate the improper points in the document.

14 Claims, 17 Drawing Sheets

```
(RULE00100
   (IF
      (==($GET"DOCUMENT TYPE")
       "IN-HOUSE TECHNICAL DOCUMENT")
   THEN
      ($PUT"DOCUMENT PAPER SIZE" "A4
                PORTRAIT")

($PUT"DOCUMENT TYPE-SETTING"
            LATERAL TYPE-SETTING")
   )
)
```

[IN-HOUSE TECHNICAL DOCUMENT
IS OF A4 PORTRAIT SIZE AND
LATERAL TYPE-SETTING]

```
(RULE00200
   (IF
      (==($GET "DOCUMENT PAPER SIZE")
           "A4 PORTRAIT")
      (==($GET "DOCUMENT TYPE-SETTING")
           "LATERAL TYPE-SETTING")
      (>=($GET "DOCUMENT PURPOSE/IMPRESSION
                 READABILITY")
        4 )
   THEN
      (>=($GET "DOCUMENT PURPOSE/IMPRESSION
                 ATTRACTIVTY")
        4 )
   THEN
      ($PUT "DOCUMENT BASIC LAYOUT PRINTING
             FACE LEFT MARGIN"90)

($PUT "DOCUMENT BASIC LAYOUT PRINTING
             FACE RIGHT MARGIN"20)

($PUT "DOCUMENT BASIC LAYOUT COLUMN
             NUMBER"1)

)
)
```

[DOCUMENT WITH READABILITY 4 OR MORE AND ATTRACTIVITY 4 OR MORE IS SET TO HAVE LEFT MARGIN 90mm AND RIGHT MARGIN 20mm]

FIG. 3

EVALUATION RESULT OF
QUESTIONNAIRE

| EFFECT (QUESTION) | ORIGINAL DOCUMENT | PROCESSED DOCUMENT*1 |
|---|---|---|
| LEGIBLE | 1 | 1.28 |
| ATTACTIVE | 1 | 1.88 |
| READABLE | 1 | 1.55 |
| UNDERSTANDABLE | 1 | 1.30 |
| GOOD | 1 | 1.28 |

*1 DOCUMENT EXAMPLE OBTAINED BY THE
DOCUMENT PREPARATION SUPPORT SYSTEM
OF THE INVENTION

CORRECTED BASED ON QUESTIONNAIRE
RESULT OF ABOVE SAMPLES WITH REFERENCE
RATE OF PREEDITED DOCUMENT 1

```
PAPER SIZE A4 PORTRAIT SETTING ( )
{
    DOCUMENT PAPER SIZE = "A4 PORTRAIT";
    LAYOUT PROCESSING ( )
}
```

[MEANS FOR EXECUTING
PAPER SIZE OF A4 PORTRAIT]

FIG. 9

```
PAPER SIZE A4 PORTRAIT SETTING ( )
{
    PAPER SIZE VERTICAL LENGTH
    SETTING(297);/*UNIT[mm]*/

PAPER SIZE LATERAL LENGTH
    SETTING(210);/*UNIT[mm]*/
}
```

[MEANS FOR EXECUTING
PAPER SIZE OF A4 PORTRAIT]

FIG. 10

```
(RULE00100
   (IF
     (==($GET "DOCUMENT TYPE")
        "OHP MATERIAL)
     (< ($GET "DOCUMENT PRINTING FACE
         LATERAL LENGTH") 200)
   THEN
     ($PUT "IMPROPER POINT DOCUMENT PRINTING
        FACE LATERAL LENGTH" "TOO LONG")
   )
)
```

[PRINTING FACE LATERAL LENGTH 200mm OR MORE IS TOO LONG FOR OHP MATERIAL]

```
(RULE00200
  (IF
    (== ($GET "DOCUMENT TYPE")
        "OHP MATERIAL")

(>= ($GET "DOCUMENT PURPOSE/IMPRESSION
               READABILITY")
        3 )
    (< ($GET "DOCUMENT TEXT CHARACTER TYPEFACE SIZE")
       12 )
  THEN
    ($PUT "IMPROPER POINT DOCUMENT TEXT CHARACTER
           TYPEFACE SIZE" "TOO SMALL")
  )
)
```

[CHARACTER SIZE OF LESS THAN 12POINTS IS TOO SMALL FOR-OHP MATERIAL DESIRED TO BE READABLE]

FIG.16

```
(RULE01100
   (IF
      (==($GET "IMPROPER POINT DOCUMENT TYPEFACE
               LATERAL LENGTH") "TOO LONG"

(==($GET "DOCUMENT TYPE")"OHP MATERIAL)

(>=($GET "DOCUMENT PURPOSE/IMPRESSION
                  READABILITY")
         3 )
      (>=($GET "DOCUMENT PURPOSE/IMPRESSION
                  ATTRACTIVITY")
         4 )
   THEN
      ($PUT "DOCUMENT TYPEFACE LATARAL LENGTH"170)
   )
)
```

[WHEN IMPROVING TOO LONG PRINTING FACE LATERAL LENGTH OF OHP MATERIAL, THE LATERAL LENGTH OF PRINTING FACE IS SET TO BE 170mm IF FAIRLY READABLE(READABILITY 3 OR MORE) AND HIGHLY ATTRACTIVE(ATTRACTIVITY 4 OR MORE) FINISHED DOCUMENT IS DESIRED]

FIG. 17

```
(RULE01200
   (IF
      (==($GET "IMPROPER POINT DOCUMENT TEXT
         CHARACTER TYPEFACE SIZE" "TOO SMALL")

(==($GET "DOCUMENT TYPE")
            "OHP MATERIAL")

(>=($GET "DOCUMENT PURPOSE/IMPRESSION
                  READABILITY")
         5 )
      THEN
         ($PUT "DOCUMENT TEXT CHARACTER TYPEFACE SIZE")
            1 4 )

)
)
```

[FOR IMPROVING TOO SMALL CHARACTER IN OHP MATERIAL, THE SMALLEST CHARACTER(TEXT) IS SET TO BE 14POINTS IF READABILITY IS STRONGLY DESIRED (READABILITY 5 OR MORE)]

FIG. 18

```
PRINTING FACE LATERAL LENGTH SETTING
      (PRINTING FACE LATERAL LENGTH)
{

PAPER FACE LATERAL LENGTH=DOCUMENT PAPER
              SIZE LATERAL LENGTH;
    MARGIN=(PAPER FACE LATERAL LENGTH-PRINTING
              FACE LATERAL LENGTH)/2;

DOCUMENT PRINTING FACE LEFT MARGIN=MARGIN;
    DOCUMENT PRINTING FACE RIGHT MARGIN=MARGIN;
              LAYOUT PROCESSING( );
}
```

[MEANS FOR SETTING LATERAL LENGTH OF PRINTING FACE]

FIG. 23

```
PRINTING FACE LATERAL LENGTH SETTING
     (PRINTING FACE LATERAL LENGTH)
{
    PRINTING FACE VERTICAL LENGTH SETTING
    (PRINTING FACE LATERAL LENGTH "CENTERING);
}
```

[MEANS FOR SETTING LATERAL LENGTH OF PRINTING FACE]

FIG. 24

DOCUMENT PREPARATION SUPPORT SYSTEM USING KNOWLEDGE DATABASE TO DETERMINE DOCUMENT LAYOUT

This application is a continuation of Ser. No. 08/499,010, filed Jul. 6, 1995, now abandoned, which is a continuation of Ser. No. 07/955,835, filed Oct. 2, 1992, now abandoned.

BACKGROUND OF THE INVENTION

1. Field of the Invention

The present invention relates to document preparation support systems for inputting and editing a document to prepare a new document and more particularly, to a document preparation support system which effectively supports document preparation of document preparer based on document editorial design knowledge.

2. Description of the Related Art

In preparing a document, generally speaking, preparation of a document from its very beginning imposes a considerable amount of labor on a document preparer. This is because, in preparation of the document, he must decide not only the contents itself of the document but also, e.g., the layout of the document, the size and typeface of characters in the document which determine the impression and appearance of the finished document. Further, when the preparer is required to select one of combinations of colors as when it is desired to create a colored document, in particular, the ordinary preparer usually cannot select the suitable color combination.

For this reason, when it is desired to get a good-looking document satisfying preparer's intention and application, it has been conventional that the document preparer asks a document design expert known as an editorial designer to prepare the document, or the document preparer prepares the document by himself while holding a consultation with the editorial designer. However, the request of the document preparer to the editorial designer generally involves a lot of cost and time. For this reason, only limited types of documents have been sent to the editorial designers in actual circumstances. Meanwhile, there have been proposed techniques for supporting preparer's document preparation to produce a good document based on wordprocessors or desk top publishing (DTP) systems. Major one of such techniques is to accumulate good-looking documents which have been so far prepared and help a document preparer to re-use them, that is, to support preparer's document preparation. For example, Japanese Patent Application Laid-Open No. 63-175965 and Japanese Patent Application Laid-Open No. 1-304575 disclose a document processing system in which documents are previously classified and accumulated depending on different applications and one of the accumulated documents having the similar properties to a desired new document to be prepared is selected and for its re-use. In a document format applying method as another technique, on the other hand, one of a plurality of previously-prepared document formats is selected and the parameters of the selected document format are applied to a document to be newly prepared to obtain a relatively good quality of new document satisfying preparer's intention and application. An example embodying this method is such a system as a LaTex (Lamport. L. LATEX: A Document Preparation System, Addition-Wesley, 1985) which is used as a document editing system. There has also been proposed in these years a document editing system which analyzes the logical structure of a document and on the analysis result, selects and applies a suitable format, as disclosed in Japanese Patent Application Laid-Open No. 62-229364 and Japanese Patent Application Laid-Open No. 1-180062.

However, in the method for re-using the past documents, the more the document examples to be selected are the more difficult it is for a document preparer to select one of the examples meeting his intention and application. Further, the less the document examples to be selected are the less the possibility of selecting one of the examples satisfying his intention and application is, which requires the preparer, after selecting the document, to again modify and correct the selected document. Furthermore, when the preparer cannot understand the system to such an extent that which part in the document example reflects his intention and application, he cannot judge the part in the document example to be re-used. Accordingly, ordinary document preparers could use the system only at the time of the preparation of such regular form documents as business letters.

Meanwhile, in the document-format applying method, so long as the selection of a document format is right, a certain constant level of quality of document can be obtained. However, since this is on a format basis to the best of its ability and such information inherent in the document being prepared as data on whether or not the document can be included in one page or data on the number of characters for a title is not utilized, it is impossible to expect a certain level of or higher level of quality of document. Further, since this method cannot always provide formats meeting document preparer's intention and application, he, after once preparing the document, has to modify or correct it again, in some cases. Furthermore, as in the past-document re-using method, when the preparer cannot understand the system to such an extent that which part in the finished document obtained through the format application reflects his intention and application, he cannot correct improper points generated under the inherent conditions of the document or improper points caused by the unsuitable selection of the format in the finished document. Accordingly, ordinary document preparers could not obtain always a desired document.

The both methods have had a problem that since the ordinary document preparer does not have such knowledge as editorial design nor how to reflect his intention and application on document, it is difficult to obtain such a document as to satisfy his intention and application, which results in that a certain constant quality of or higher quality of documents cannot be obtained unlike he prepares the document while holding a consultation with a design expert. Further, in either case, in general, fine consideration of how to reflect document preparer's intention on document readers having different backgrounds, positions, preferences, etc. is not paid to the both document preparation support systems, that is, preparer's intention cannot be fully transmitted to the document.

SUMMARY OF THE INVENTION

It is an object of the present invention to provide a document preparation support system which can support document preparation and produce a finished document satisfying preparer's intention and application, while eliminating the need for preparer's having such knowledge as editorial design.

Another object of the present invention is to provide a document preparation support system which can support document preparation and produce a finished document satisfying preparer's intention and application, while eliminating the need for preparer's having such knowledge as how to reflect preparer's intention and application on the document.

In a document preparation support system in accordance with a first invention, when a document preparer's indication or a signal from a device causes a document design deciding means to be started, the document design deciding means decides a document design with use of document design knowledge data accumulated in a knowledge database while making reference to the contents of a document memory means in which the attributes and contents of the document being prepared are held, and the document design deciding means displays its result on a display means. A document design executing means, when receiving the document design decided by the document design deciding means therefrom, issues an edit command to a document editing means on the basis of the received decided document design. The document editing means edits the document being prepared and held in the document memory means according to the edit command. Further, the document design deciding means, when finding lack data necessary in its deciding operation, informs an inquiry means of the lack data. The inquiry means, on the basis of the data received from the document design deciding means, displays the inquiry of the lack data on the display means in a question sentence form, and receives document preparer's response through an input means to be added in the document memory means as data. When the document design deciding means makes reference to the contents of the knowledge database, a knowledge database selecting means selects a suitable knowledge database while making reference to the contents of the document memory means. The document design deciding means decides a document design while making reference to the contents of the selected knowledge database.

In a document preparation support system in accordance with a second invention, when a document preparer's indication or a signal from a device causes an improper point indicating means to be started, the improper point indicating means finds an improper point in the document being prepared with use of improper point indication data stored in a knowledge database while making reference to the contents of the document memory means in which the attributes and contents of the document being prepared, and displays the found result on a display means. A proposed remedy extracting means, when receiving the document improper point found by the improper point indicating means therefrom, extracts a proposed remedy for the improper point with use of the knowledge database while making reference to the received data and the contents of the document memory means and displays the extracted result on the display means. A proposed remedy executing means, when receiving the proposed remedy extracted by the proposed remedy executing means therefrom, issues an edit command to a document editing means on the basis of the received result. The document editing means edits the document being prepared and held in the document memory means according to the edit command. Further, when the improper point indicating means or the proposed remedy extracting means makes reference to the contents of the knowledge database, a knowledge database selecting means selects a knowledge database on the basis of the preparer's indication received from an input means. The improper point indicating means and the proposed remedy extracting means make reference to the contents of the selected knowledge database.

BRIEF DESCRIPTION OF THE DRAWINGS

FIG. 3 is another example of the knowledge representation in the knowledge database;

FIG. 9 is an example of an executing means in a document design executor;

FIG. 10 is another example of the executing means in the document design executor;

FIG. 16 is another example of the knowledge representation in the knowledge database;

FIG. 17 is a further example of the knowledge representation in the knowledge database;

FIG. 18 is yet a further example of the knowledge representation in the knowledge database;

FIG. 23 is an example of a knowledge representation in a knowledge database;

FIG. 24 is another example of the knowledge representation in the knowledge database; and

DESCRIPTION OF THE PREFERRED EMBODIMENTS

A document preparation support system in accordance with an embodiment of the present invention will be detailed with reference to the attached drawings.

First of all, a first embodiment of the document preparation support system of the present invention will be explained by referring to FIGS. 1 to 13.

Figures 1, 2:
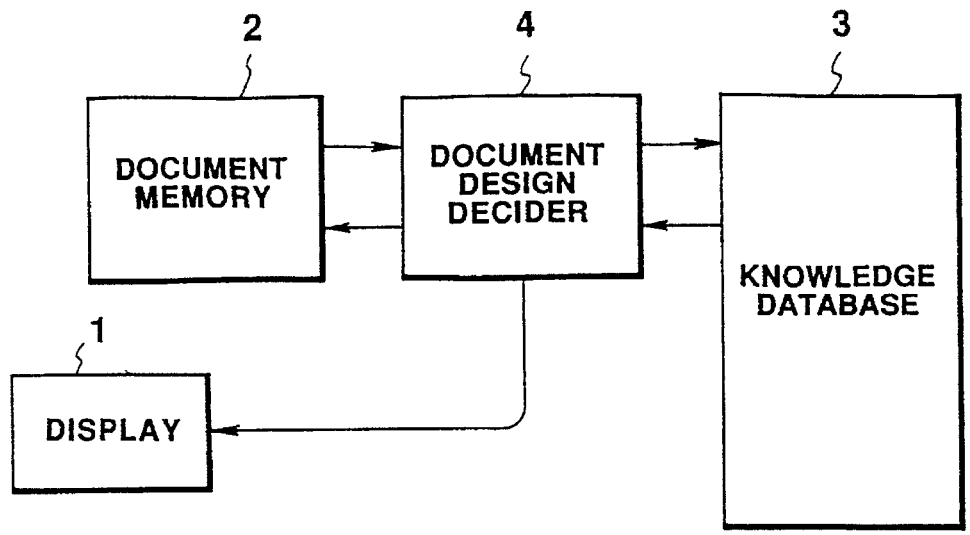
FIG. 1 is a block diagram of a document preparation support system in accordance with a first embodiment of a first invention.
FIG. 2 is an example of a knowledge representation in a knowledge database.

Referring first to FIG. 1, there is shown a block diagram of the document preparation support system of the first embodiment, which includes a display 1, a document memory 2, a knowledge database 3 and a document design decider 4.

The display 1 is such a device as a display unit or a printer which displays or outputs characters, figures, messages, etc.

The document memory 2, which comprises, for example, a magnetic disk unit or a main memory, stores therein, in the form of document data, such an electronic document as document including code data and figure data prepared by a word processor or the like together with accessory data associated with the document such as the attributes of the document including document type, preparation date and application. The document memory 2 holds data in such a state that the data can be accessed. For example, the document memory 2, when receiving an inquiry of e.g., "document paper size", can output data of "A4 Portrait".

The knowledge database 3, which comprises a magnetic disk device or an optical disk device, stores therein, as document design knowledge data, evaluation words indicative of the purpose/impression of a document, document design elements as document structure parameters including paper size, printing face size and character size, document attributes such as document type, purpose and appearance, and knowledge for prescribing relationships between these evaluation words, document design elements and document attributes, by such a knowledge representation method as an "IF-THEN" rule type or a frame type.

The document design decider 4, inference mechanism, which has been called "inference engine" in the art and will be referred to as "inference engine" in the following description draws such an inference as forward or backward reasoning, infers and decides the optimum design of the target document with use of the document design knowledge data of the knowledge database and on the basis of the document data of the document memory 2.

The knowledge representation method and the structure of the document design decider in a general knowledge database are explained in detail, for example, in a book entitled "Building Expert System", edited by F. Hayes-Roth, et al., Addison-Wesley (1983). Knowledge on document design by such a knowledge representation method as described in the above book is implemented and stored in the knowledge database 3. The word "knowledge on document design" as used herein refers to various knowledge necessary for deciding the document design including quantitative data obtained by such a subjective evaluation method as mentioned, e.g., in a paper entitled "A Study on Evaluation Scales for Document Design Quality" reported in Proceedings of the 42-nd General Meeting of the Information Processing Society of Japan, 7Q-7, 1991, such qualitative or quantitative data as mentioned in a book entitled "Presentation & Documentation", compiled by Fuji Xerox, 1989, and such data as indicative of house instructions in companies. In more detail, for example, such knowledge that "in-house technical document is of A4 Portrait and lateral type-setting" is expressed in such a form as shown in FIG. 2, and such knowledge that "an attractive and readable document is set to have left margin 90 mm and right margin 20 mm" is expressed in such a form as shown in FIG. 3.

Now explanation will be made as to the operational procedure of an inference engine in the document design decider 4 by referring to a flowchart of FIG. 4.

The document design decider 4, which uses the inference engine comprised therein, when receiving an instruction indicative of the inference start, extracts all the rules written in the IF-THEN format from the knowledge database 3 and set the extracted rules as "rules" (step 101). Next, the document design decider 4, on the basis of the data of the document memory 2, finds all ones of the "rules" in which conditions written in IF condition parts are all true and sets the found rules as "Trules" (step 103). Then, the document design decider 4 selects one of the "Trules" to execute the execution contents of the THEN execution part of the selected rule (step 105). The above rule selection and execution are repeated until the "Trules" becomes empty (step 104). As a result, the document design decider 4 decides the document design meeting preparer's purpose and application.

Explanation will next be directed to a specific example when document preparation is actually supported by the aforementioned document preparation support system.

Figure 5:
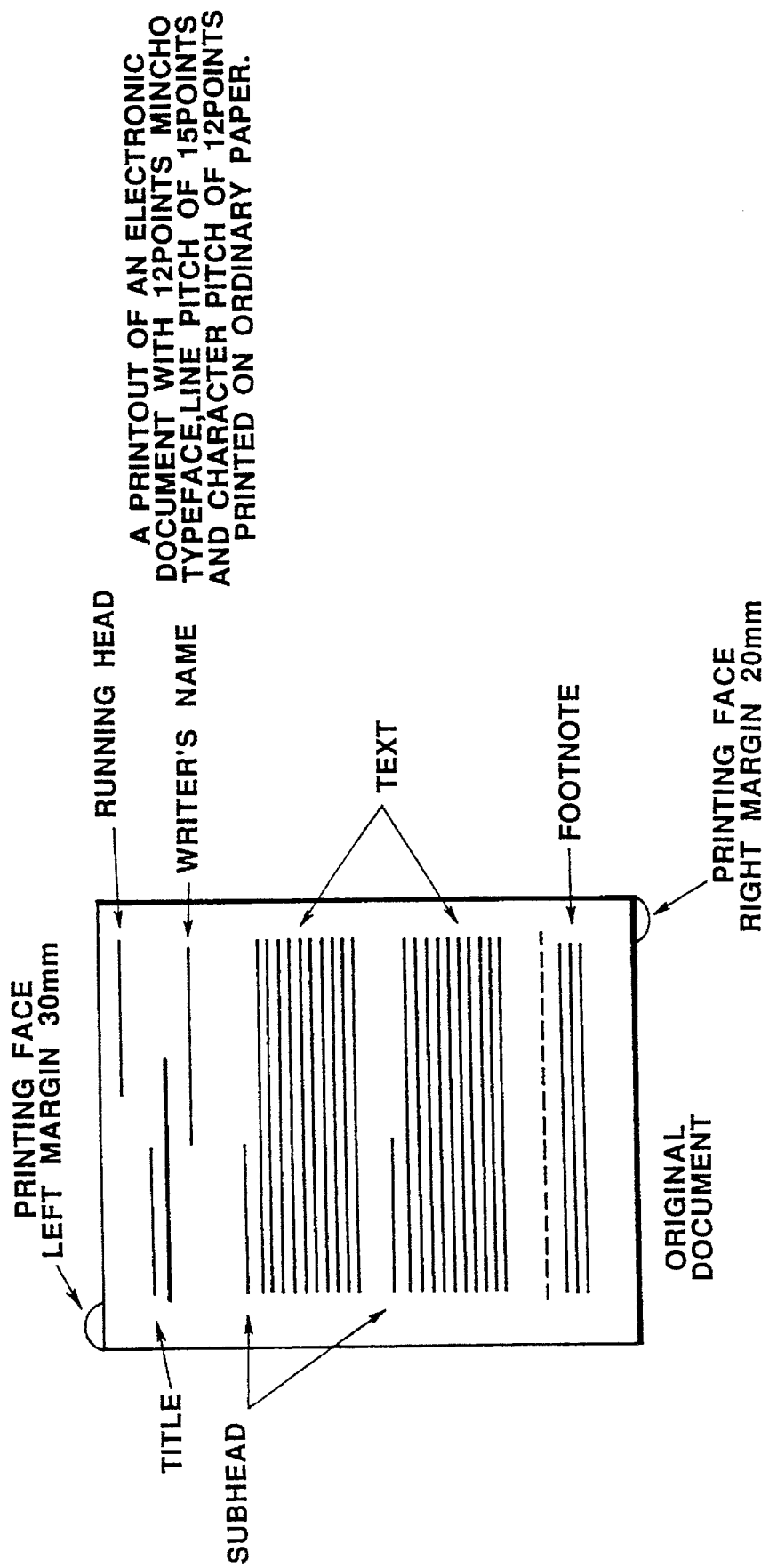
FIG. 5 is an example of an original document.

First, the document memory 2 stores therein such data on an original document as shown in FIG. 5 and its accessory data indicative of "document type: in-house technical document", "purpose/impression: legibility or readability (4), gist clearness (4), attractivity (4), formality (3) . . . ". In this example, the 'document type' refers to a plan document, a project document, a circular document, i.e., documents having different contents and applications; while the 'purpose/impression' indicates the purpose/impression which is attached to such a document as the above example. The numbers following the respective evaluation word items in the "purpose/impression: . . . " indicate one of ranks 1, 2, 3, 4 and 5 (full mark: 5), that is, the degree of image (appearance) to be provided to the resulting designed document as the purpose/impression.

Figure 4:
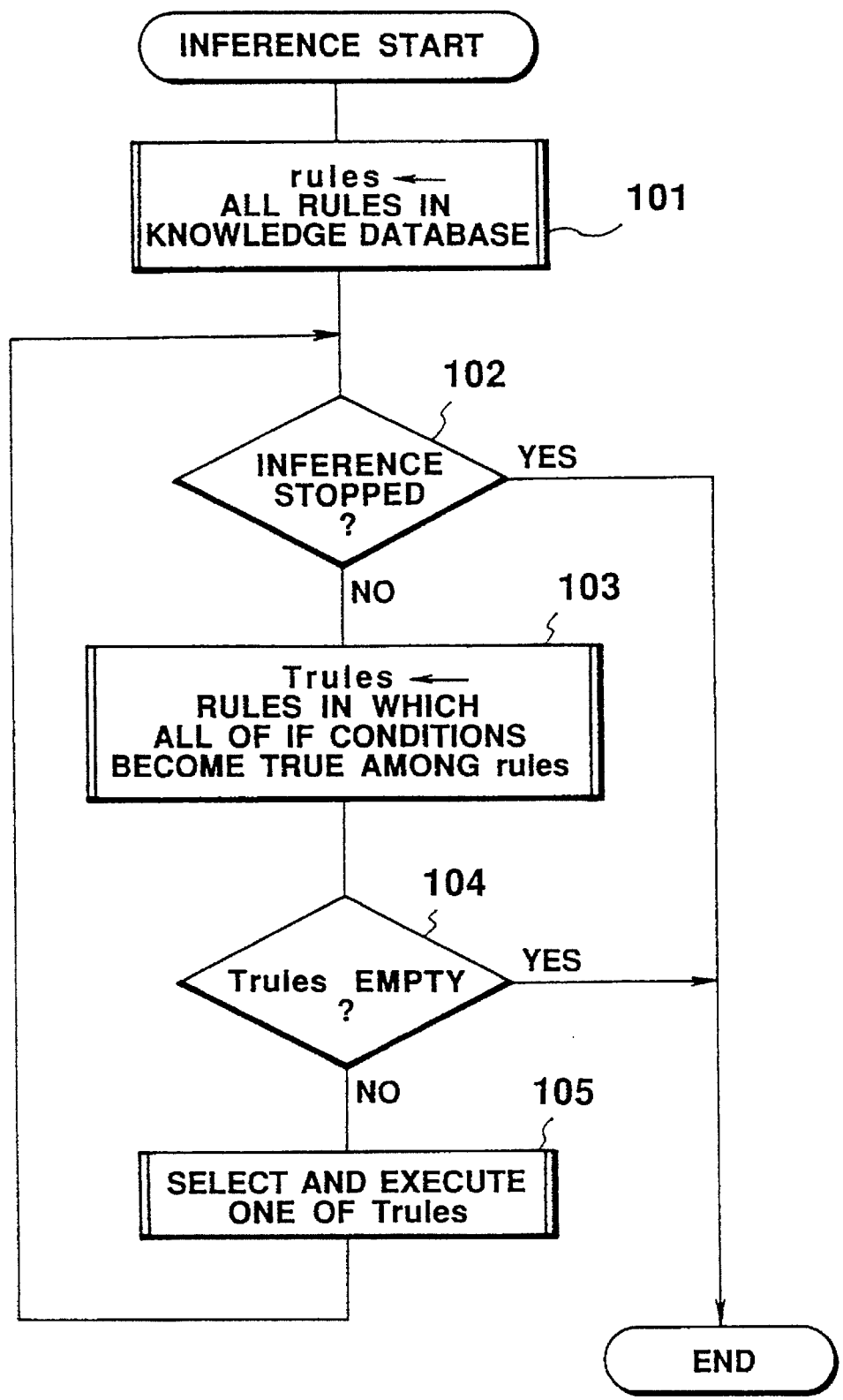
FIG. 4 is a flowchart for explaining the operational procedure of an inference engine in a document design decider.

The document design decider 4 selects and executes such a rule as shown in FIG. 2 according to the operational procedure of FIG. 4 to decide a format of A4 Portrait and lateral writing. This is a rule which is selected in the document memory 2 on the basis of the accessory data "document type: in-house technical document" because its IF conditional part becomes true. This means that, when in-house technical documents should have a format of A4 Portrait and lateral writing according to the in-house instructions for example, such a rule is selected and determined. Similarly, the document design decider 4 further selects and executes such a rule as shown in FIG. 3 on the basis of data indicative of the decision of the format of A4 Portrait and lateral writing to decide the left and right margins of the printing sheet to be 90 mm and 20 mm respectively. This means that, for the purpose of drawing reader's attention to the in-house technical document of A4 Portrait and lateral writing and avoiding reader's bad feeling with too many words in one sheet for example, it is desirable to set a sum of the left and right margins to be large and to shift the printed part rightward in the sheet to give the reader easy reading at the time of leafing the sheet. Similarly, since it is desired to provide a highly clear gist and understandability (high gist clearness), such document design is determined that the size of a subhead is set to be 1.2 times the size of the document text and the subhead is projected leftward from the left end of the document text, and then necessary document design parameters are determined, at which stage the inference is completed.

Figure 6:
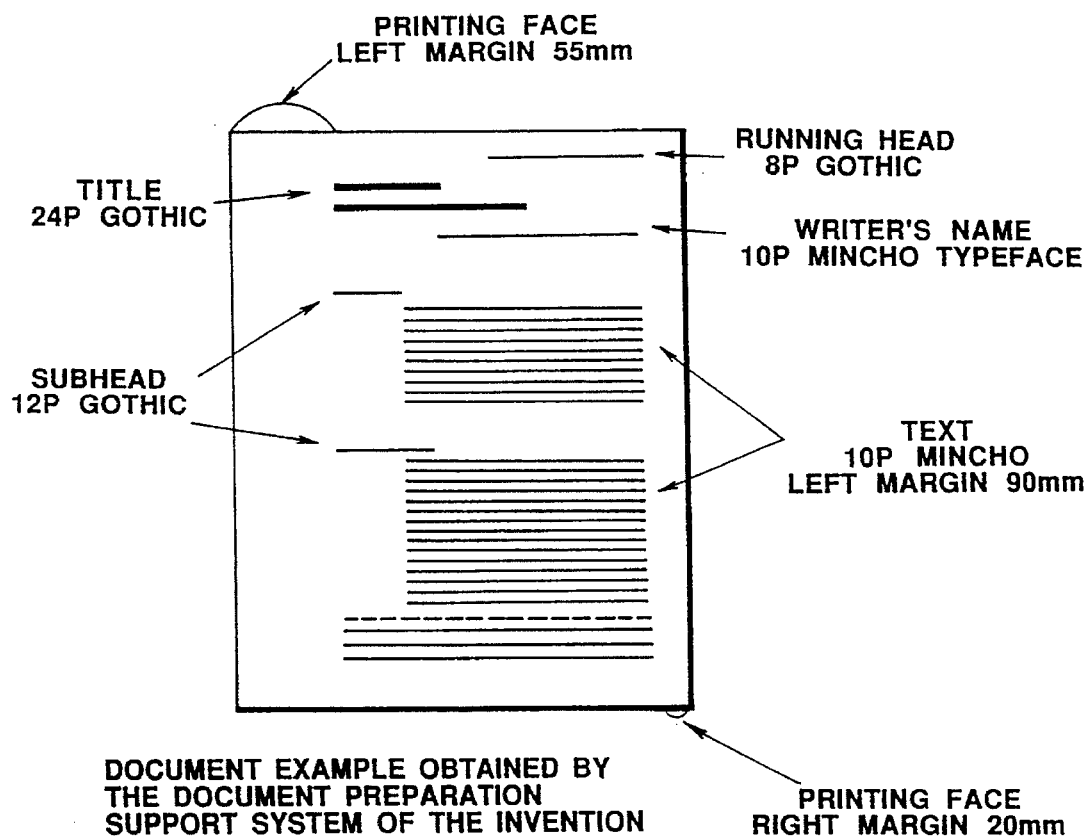
FIG. 6 is an example of the original document after processed/edited.

The values of the document design parameters thus obtained are displayed on the display 1 and the preparer can edit the document according to the displayed values. An example of the document as the obtained result is shown in FIG. 6. Alternatively, only the data necessary for the editing may be listed to the preparer on the basis of the values of the document design parameters.

Figures 7, 8:
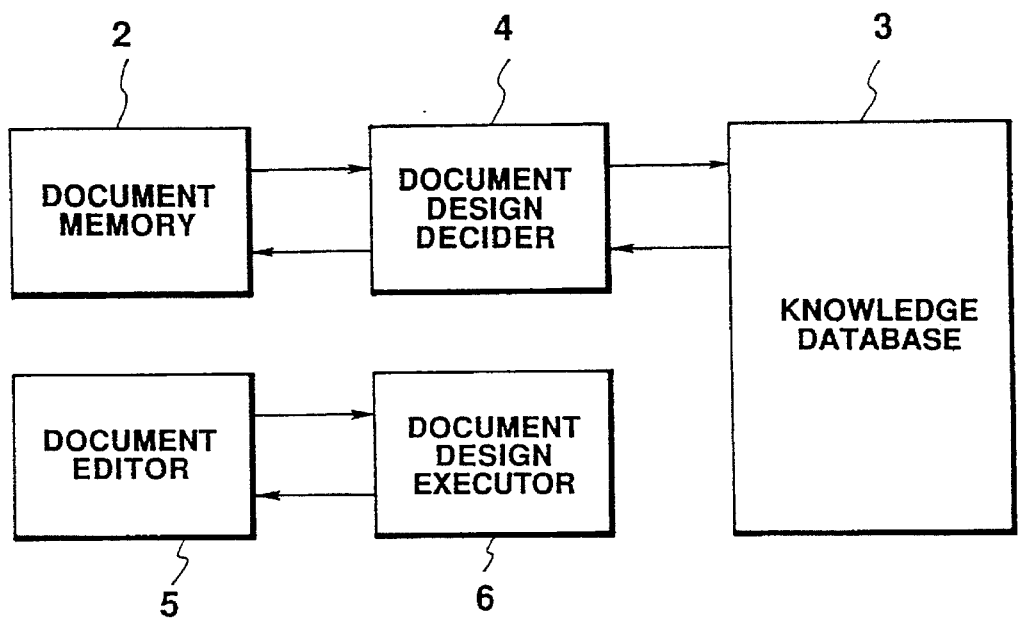
FIG. 7 is a block diagram of a document preparation support system in accordance with a fourth embodiment of the second invention.
FIG. 8 is a block diagram of a document preparation support system in accordance with a second embodiment of the first invention.

A second embodiment of the invention will be explained. Referring to FIG. 8, there is shown a block diagram of a document preparation support system in accordance with the second embodiment of the present invention. The document preparation support system of FIG. 8 corresponds to that of FIG. 1 but the display 1 in FIG. 1 is replaced by a document editor 5 for editing the document stored in the document memory 2 and a document design executor 6 for applying the design determined by the document design decider 4 to the document being processed through the document editor 5. Other arrangement is substantially the same as that of FIG. 1 and parts having the same functions are denoted by the same reference numerals as in FIG. 1 (which will hold true for the subsequent embodiments). In the present embodiment, the document design parameters displayed on the display 1 in the foregoing first embodiment are sent from the document design decider 4 to the document design executor 6.

The document editor 5 has a document preparing/editing function in ordinary work processors and desk top publishing (DTP) devices; while the document design executor 6 executes the document preparing/editing function of the document editor 5 and edits the document held in the document memory 2 in such a manner that the document has the previously-determined document design parameters. In general, the document design executor 6 depends deeply on the document editor 5. For example, when it is desired to set the paper size of the document to be A4 Portrait, if such setting is done in the document editor 5 that "data 'A4 Portrait' is placed in a memory for designation of the paper size of the document to execute a special processing known as <layout processing>", then the document design executor 6 can have such an executing means as shown in FIG. 9. Also, when it is desired to set the paper size of the document to be A4 Portrait, another means for setting the vertical and lateral lengths as the paper size of the document to be suitable values respectively is provided in the document editor 5, then the document design executor 6 have such an executing means as shown in FIG. 10.

In this way, the document design executor 6 has means for causing the editing operation to be carried out in such a manner that the document held in the document memory 2 through the document editor 5 have all the document design parameters determined by the document design decider 4. And the aforementioned executing means executes all the document design parameters received from the document design executor 6. As a result, the document held in the document memory 2 can have the design determined by the document design decider 4.

Figure 11:
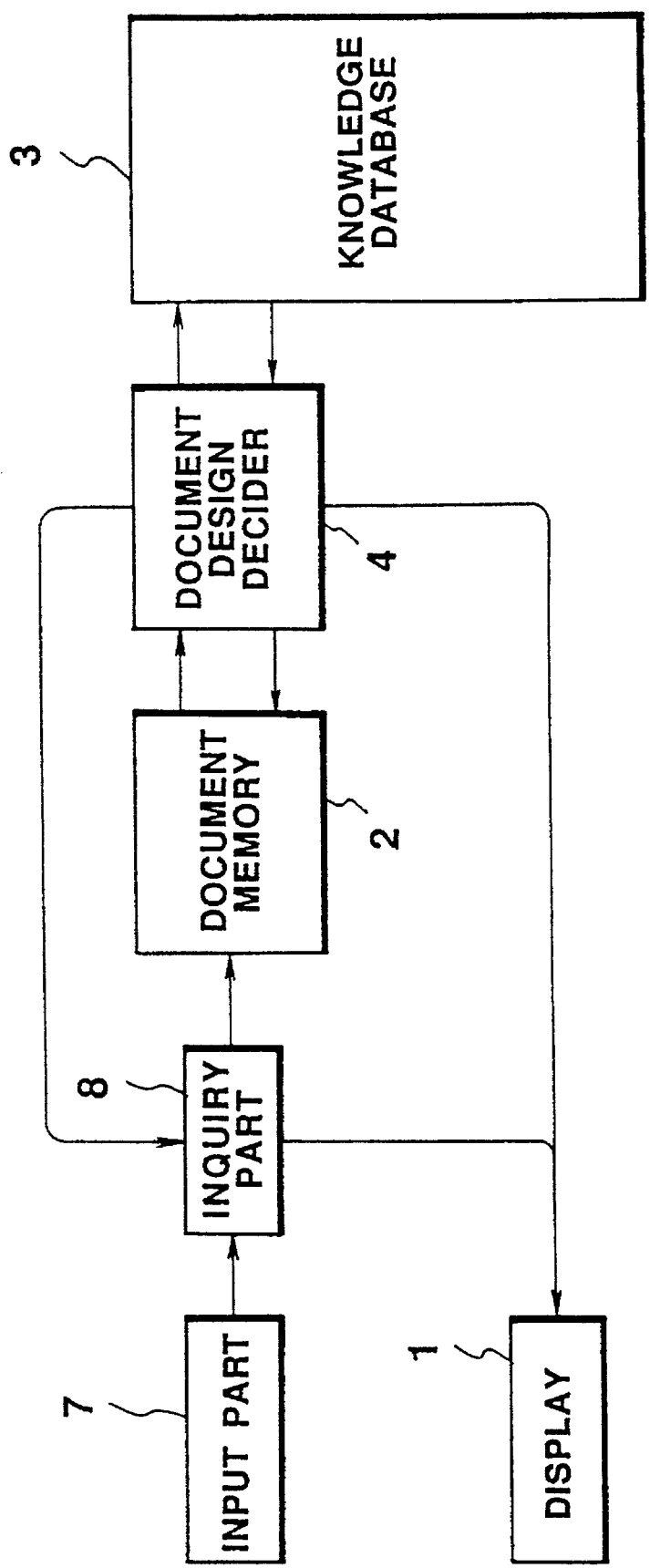
FIG. 11 is a block diagram of a document preparation support system in accordance with a third embodiment of the first invention.

Explanation will next be made as to a third embodiment of the present invention. FIG. 11 shows a block diagram of a document preparation support system in accordance with the third embodiment of the present invention. The document preparation support system of FIG. 11 includes, in addition to the arrangement of FIG. 1, an input part 7 for entering a command, etc. and an inquiry part 8. The inquiry part 8 have means (not shown) for causing the data required as necessary data by the document design decider 4 to be displayed on the display 1 in a question sentence form and means (not shown) for receiving a response to the question from the input part 7 and adding it to the document memory 2.

In the present embodiment, when the document design decider 4 inquires of the document memory 2 about, e.g., "document type" and the associated data is not held in the document memory 2, the document memory 2 performs such operation as to return such a special value as "nil" to the document design decider 4 therefrom. And the document design decider 4, when receiving the "nil" from the document memory 2, once interrupts its operation and moves the control to the inquiry part 8 to cause the document editor or preparer to enter the associated value into the document memory 2, whereby the control is again returned to the document design decider 4 to execute the interrupted operation. In other words, when the document design decider 4 fails to find attribute data necessary for deciding the design, the document design decider 4 informs the inquiry part 8 of the lack attribute data, whereby the lack data is displayed on the display 1 to tell the preparer about it. When the preparer enters the lack attribute data through the input part 7, he can create his intended document. In this way, the document preparer can inform the system of his intention and application by entering the lack attribute data together with its original document into the document memory 2 through the input part 7. Although the system inquires of the document preparer about the attribute data in this example, the inquiry contents is not limited to the attribute data.

Figure 12:
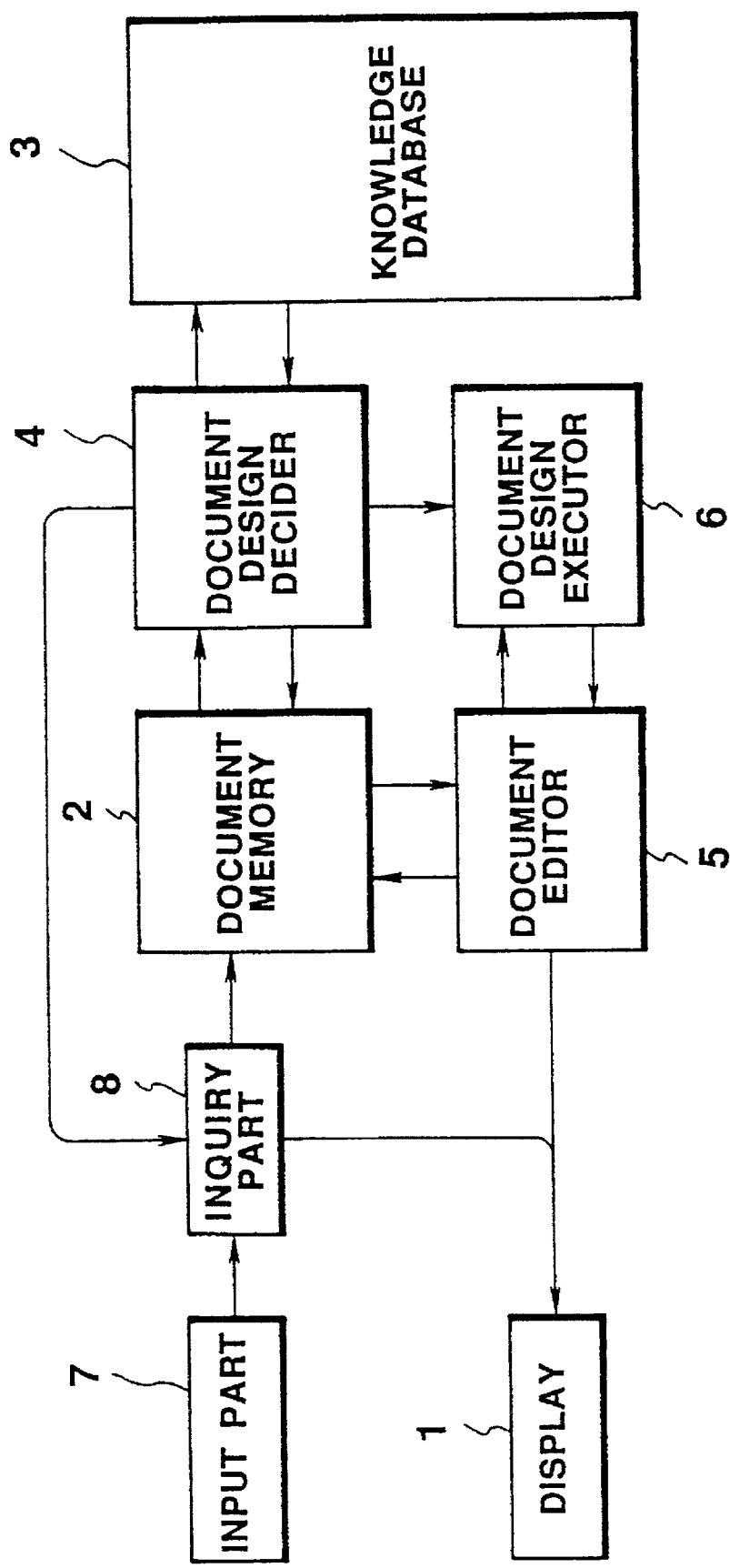
FIG. 12 is a block diagram of a document preparation support system in accordance with a fourth embodiment of the first invention.

Next, explanation will be directed to a fourth embodiment of the invention. Shown in FIG. 12 is a block diagram of a document preparation support system in accordance with the fourth embodiment of the present invention. The document preparation support system of FIG. 12 includes, in addition to the arrangement of FIG. 11, a document editor 5 for editing the document stored in the document memory 2 and a document design executor 6 for applying the design determined by the document design decider 4 to the document being prepared through the document editor 5. The functions of the document editor 5 and document design executor 6 are substantially the same as those in FIG. 8. In the illustrated embodiment, the document design parameters displayed on the display 1 in the foregoing third embodiment are sent to the document design executor 6 to perform the similar operation to in the foregoing second embodiment. In other words, the present document preparation support system has, in addition to the editing function of the second embodiment, lack data inquiring function of the third embodiment, that is, has both the advantage of the second embodiment and the advantage of the third embodiment.

Figure 13:
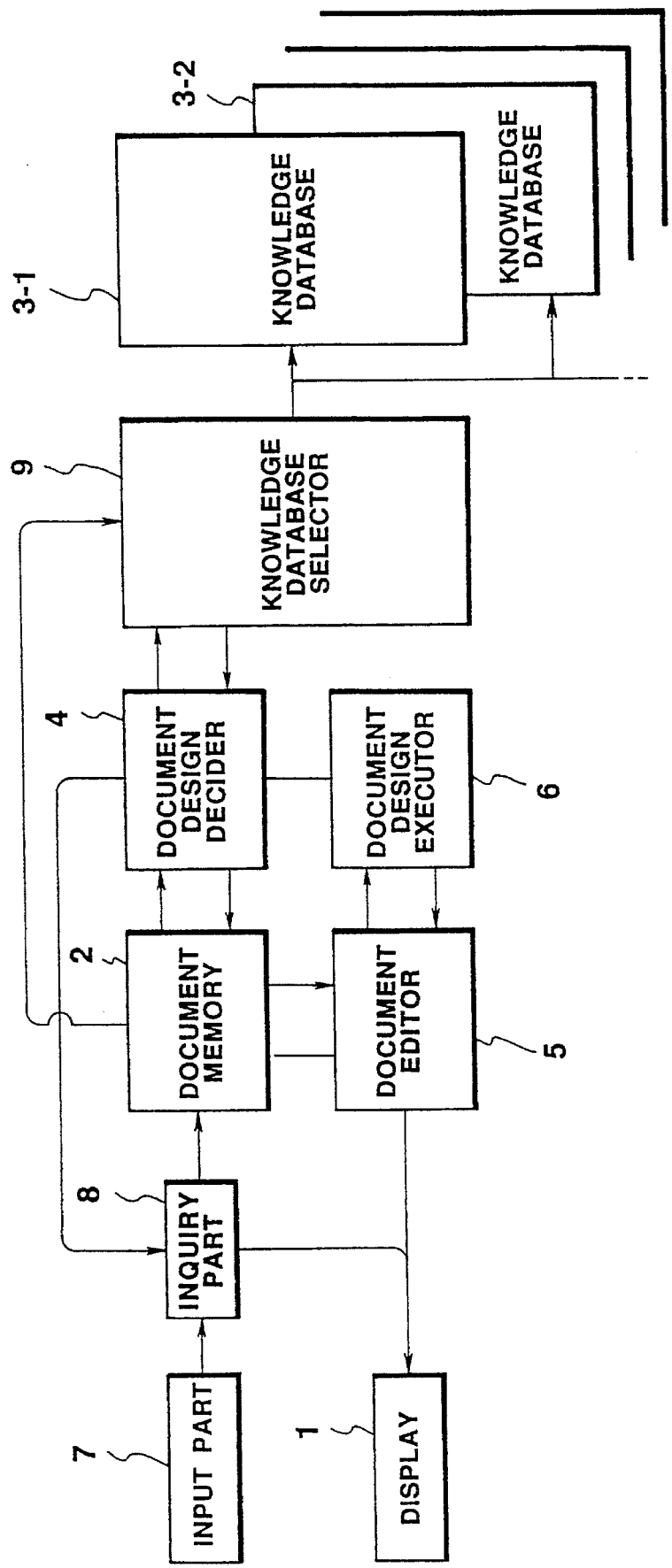
FIG. 13 is a block diagram of a document preparation support system in accordance with a fifth embodiment of the first invention.

Next, a fifth embodiment of the invention will be explained. Referring to FIG. 13, there is shown a block diagram of a document preparation support system in accordance with the fifth embodiment of the present invention. In the present embodiment, the knowledge database 3 shown in the first-fourth embodiments is made up of a plurality of sub-databases prepared as classified based on the type, associated person, etc. of documents. Also held in the document memory 2 is data for selecting one of the plurality of knowledge databases 3-1, 3-2 . . . so that a knowledge database selector 9 is provided for selecting one of the plurality of knowledge databases 3-1, 3-2 . . . on the basis of the data of the document memory 2. Although the arrangement of FIG. 13 is based on the arrangement of FIG. 12, the arrangement of FIG. 13 may be similarly based on the arrangement of FIG. 1, 8 or 11. Reference has been made to the single database in the foregoing first-fourth embodiments. In the present document preparation support system, however, the knowledge database selector 9 selects associated one from the plurality of knowledge databases according to the attribute data of, e.g., a technical document to retrieve the associated knowledge database. With such an arrangement, finer knowledge can be retrieved in a shorter time and thus the supporting effect can be enhanced. Further, since the knowledge database is divided into the plurality of sub-databases, specific one or ones of the plurality of sub-databases can be mounted on another system in some applications, whereby the database requiring a lot of labor and cost for its preparation and maintenance can be efficiently utilized. In addition, knowledge databases may be allocated to different document designs so that the document preparer can select desired one of the design knowledge databases.

Document preparation support systems in accordance with embodiments of a second invention will be explained by referring to FIGS. 14 to 25.

Figures 14, 15:
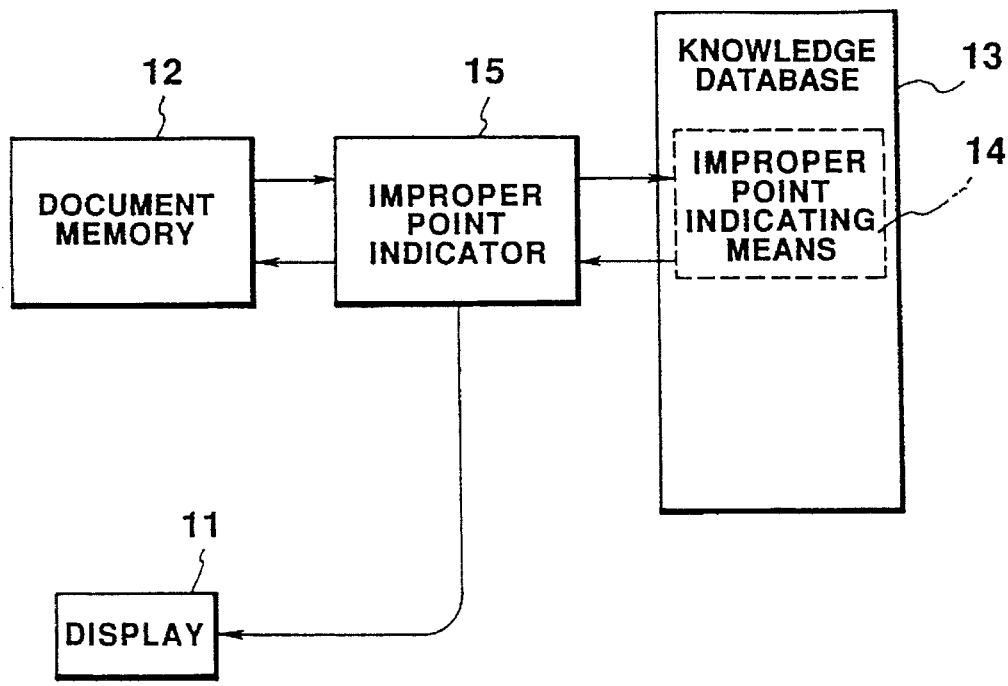
FIG. 14 is a block diagram of a document preparation support system in accordance with a first embodiment of a second invention.
FIG. 15 is an example of a knowledge representation in a knowledge database.

FIG. 14 shows a block diagram of a document preparation support system of a second embodiment of the first invention. The document preparation support system of FIG. 14 includes a display 11, a document memory 12, a knowledge database 13 and an improper point indicator 15.

More specifically, the display 11 comprises, for example, a display unit or a printer which displays or outputs characters, figures, messages or the like.

The document memory 12, which comprises, for example, a magnetic disk device or a main memory, stores therein as document data an electronic document of data on codes and figures prepared by a word processor or the like and accessory data including attributions of the document such as type, preparation date, application, etc. The data of the document memory 12 are held on the above magnetic disk device or the main memory in accessible state. For example, when the user wishes to know the type of the document and inquires about "document. type", he can get such data "OHP material" (OHP is the acronym of "overhead projector"); while when he wishes to know the size of the typeface of characters in the document and inquires about "document. text. character. typeface. size", he can get such data as "12 (points)".

The knowledge database 13 has the improper point indicating means 14 which stores therein improper point indicating data in which proper and improper relationships are described between the document attributes such as the type, purpose, finish impression, etc. of the document and the document structure parameters such as the paper size, printing face size, character size in such a knowledge representation as an IF-THEN rule format or a frame format. The improper point indicating means 14 comprises a magnetic disk device or an optical disk device.

The improper point indicator 15, on the basis of the document data of the document memory 12, extracts improper points in the document while performing inferring operation from the data of the improper point indicating means 14 of the knowledge database 13. The improper point indicator 15 comprises such an inference engine as to perform forward or backward reasoning or inference.

For details of the knowledge representation of a general knowledge database and the arrangement of the inference engine, refer to, for example, a reference book entitled "Building Expert System", edited by F. Hayes-Roth, et al, Addison-Wesley, 1983.

The knowledge database 13 stores therein improper point indicating means and improper point improving means (not shown: to be explained in the subsequent embodiments) expressed in such a knowledge representation as described in the aforementioned reference literature. In this connection, the improper point indicating means and improper point improving means refer to various sorts of knowledge necessary for deciding the desirable or undesirable state of documents or necessary for improving the document in the undesirable state into the desirable state, including qualitative or quantitative data and data indicative of in-house instructions in a company or office, as stated in a reference book entitled "Presentation & Documentation", written by Fuji Xerox, Fuji Xerox, 1989. More concretely, examples of the knowledge for indicating an improper point include a knowledge of "printing face lateral length of 200 mm or more is too long for OHP materials" which is expressed in such a format as shown in FIG. 15, and a knowledge of "characters having a size of less than 12 points are too small for OHP materials desired to be readable" which is expressed in such a format as shown in FIG. 16. Meanwhile, examples of the knowledge for improving an improper point include a knowledge of "when improving too long printing face lateral length of OHP materials, the lateral length of printing face is set to be 170 mm if a fairly readable and highly attractive finished document is desired" which is expressed in such a format as shown in FIG. 17, and a knowledge of "for improving too small characters in OHP materials, the smallest character (text)is set to be 14 points if readability is strongly desired" which is expressed in such a format as shown in FIG. 18.

The operational procedure of the inference engine in the improper point indicator 15 is based on the flowchart of FIG. 4. More in detail, the improper point indicator 15, when receiving an inference start command, first extracts from the knowledge database 13 all the rules associated with the indication of improper points written in the IF-THEN format, and finds ones of the extracted rules whose IF conditional parts become all true based on the data of the document memory 12. The improper point indicator 15 then selects only one of the found rules whose IF conditional parts becomes all true and executes the execution contents written in the THEN execution part of the selected rule. These rule selection and execution are repeated until an inference stop command for the THEN execution part is issued or a rule to be selected becomes nil. In this way, the improper point indicator 15 indicates substantially all improper points in the document being prepared.

Explanation will then be made as to a specific example when the document preparation is actually supported through the aforementioned document preparation support system.

Figure 19:
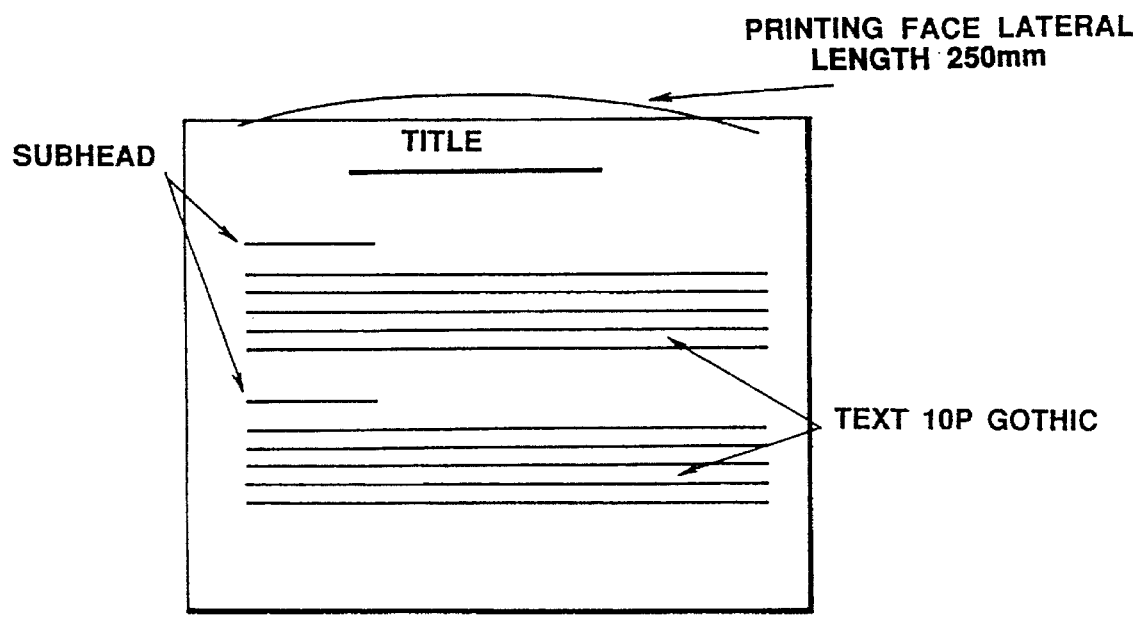
FIG. 19 is an example of an original document.

First, the document memory 12 stores therein such an original document as shown in FIG. 19 and its accessory data indicative of "document type: OHP material", "document purpose/impression: readability (5), gist clearness (3), attractivity (5), formality (3) . . . ", etc. (which will be used even in the subsequent embodiments). In this case, the numbers following the respective evaluation items in 'purpose/impression' denote respectively one of levels 1, 2, 3, 4 and 5 (level 5 for the highest quality).

The improper point indicator 15 selects and executes such a rule as shown in FIG. 15 according to the aforementioned operational procedure to indicate the improper point "the lateral length of printing face is too long". This rule is selected in the document memory 12 on the basis of the accessory data "document type: OHP material" because the IF conditional part of the rule becomes true. This rule indicates an improper point that, when the lateral length of the document as OHP material is too long, the character lines of the document to be printed might be truncated depending on the shape of a light source in an OHP device. The improper point indicator 15 further performs its rule selecting operation and selects and executes such a rule as shown in FIG. 16. This rule selected in the document memory 12 on the basis of the data "document type: OHP material, readability (5)" because the IF conditional part of the rule becomes true. This rule indicates an improper point that, when small characters are used for the OHP material, the characters of the OHP material when actually projected become illegible because of the too small characters. In this way, the improper point indicator 15 sequentially indicates substantially all improper points, at which stage the inferring operation is completed.

The improper points thus obtained are displayed on the display 11, on the basis of which the document preparer can edit the document.

Figure 20:
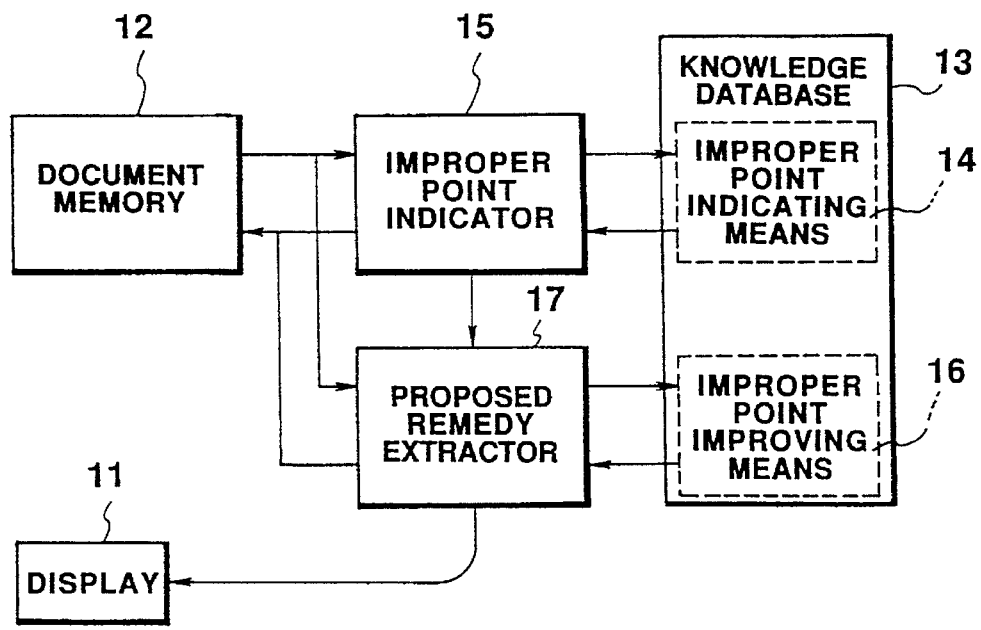
FIG. 20 is a block diagram of a document preparation support system in accordance with a second embodiment of the second invention.

Next, a second embodiment of the second invention will be explained. Shown in FIG. 20 is a block diagram of a document preparation support system in accordance with the second embodiment of the second invention. The document preparation support system of FIG. 20 includes, in addition to the arrangement of FIG. 14, a proposed remedy extractor 17 for storing in the knowledge database 13 improper point improvement data in which a relationship between the improper point of the document and a measure to improving the point is described and also for extracting such a proposed remedy from the knowledge database 13. The above improper point improvement data is stored in the knowledge database 13 as an improper point improving means 16.

The proposed remedy extractor 17, which comprises an inference engine performing such inferring operation as forward or backward reasoning as in the improper point indicator 15, performs inferring operation with use of the data of the improper point improving means 16 of the knowledge database 13 while making reference to the data of the document memory 12 on the basis of the result data issued from the improper point indicator 15 to thereby extract the proposed remedy of the improper point. In the present embodiment, a list of the improper points displayed on the display 11 in the foregoing first embodiment of the first invention is sent to the proposed remedy extractor 17.

The operational procedure of an inference engine in the proposed remedy extractor 17 is based on the flowchart of FIG. 4. More specifically, the proposed remedy extractor 17, when receiving an inference start command, first extracts from the knowledge database 13 all the rules associated with indication of improper points and written in the IF-THEN format through the motion of the inference engine, and then finds all ones of the extracted rules whose IF conditional parts become all true on the basis of the data received from the improper point indicator 15 and the data of the document memory 12. The proposed remedy extractor 17 then selects only one of the found rules and executes the execution contents written in the THEN execution part of the selected rule. These rule section and execution are repeated until an inference stop command is issued to the THEN execution part or a rule to be selected becomes nil. In this manner, the proposed remedy extractor 17 extracts the proposed remedy for the indicated improper point.

The proposed remedy extractor 17, according to the aforementioned operational procedure, selects and executes such a rule as shown in FIG. 17 and extracts the proposed remedy "the lateral length of the printing face is set to be 170 mm". This rule is selected in the document memory 12 on the basis of the accessory data "document type: OHP material, readability (5), attractivity (5)" because the IF conditional part of the rule becomes true. This means that, of legible OHP materials, especially for highly attractive materials, it is desirable to set the lateral length of the printing face to be 170 mm that is shorter than 200 mm to provide a somewhat slender design. Further, the proposed remedy extractor 17 similarly selects and executes such another rule as shown in FIG. 18 and extracts a proposed remedy "text character size of 14 points". This rule is selected on the basis of the data "document type: OHP material, readability (5)" received from the improper point indicator 15 because the IF conditional part of the rule is true. This means that, when especially legible OHP materials out of readable OHP materials is desired, the character size is set to be at least 14 points for legibility. Thereafter, in the similar manner to the above, the proposed remedy is sequentially extracted until all the proposed remedies are extracted, at which stage the inferring operation is completed.

Figure 21:
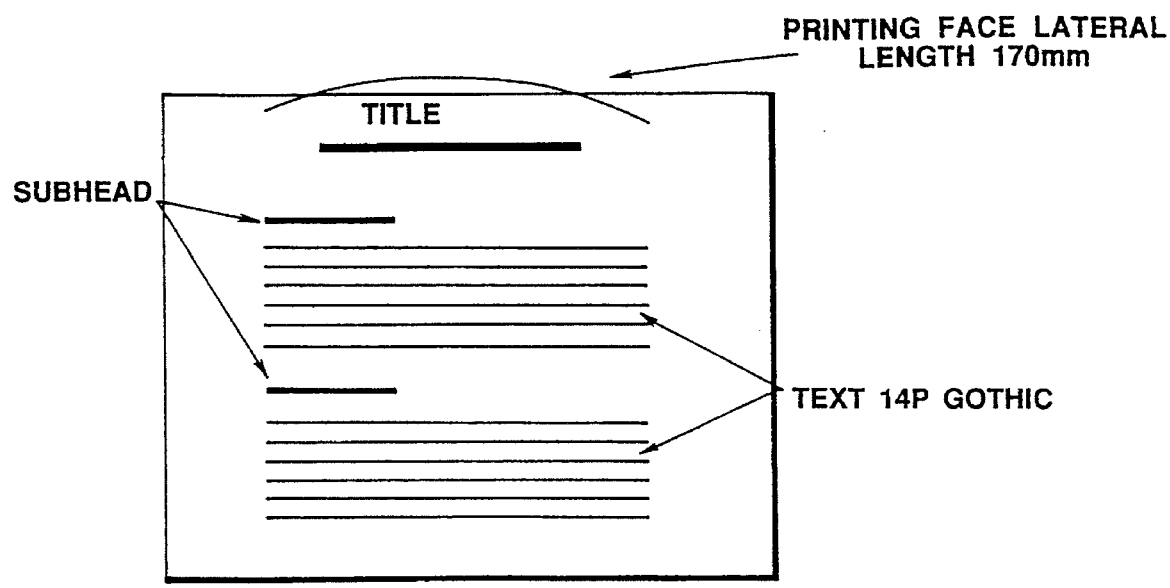
FIG. 21 is an example of the original document after processed/edited.

The proposed remedies thus obtained are displayed on the display 11 on the basis of which the document preparer can edit the document. An example of the document obtained through the actual execution of the proposed remedies is shown in FIG. 21.

Figure 22:
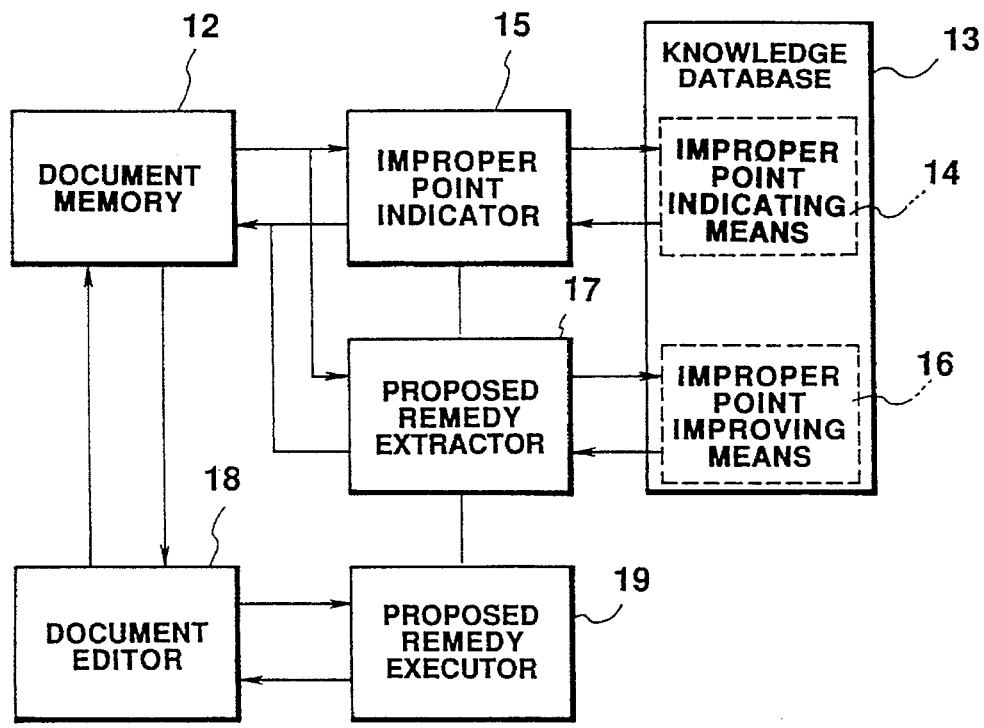
FIG. 22 is a block diagram of a document preparation support system in accordance with a third embodiment of the second invention.

Explanation will next be made as to a third embodiment of the second invention. FIG. 22 shows a block diagram of a document preparation support system in accordance with the third embodiment of the second invention. The document preparation support system of FIG. 22 corresponds to the document preparation support system of FIG. 20 but the display 11 in FIG. 20 is replaced by a document editor 18 for editing the document stored in the document memory 12 and a proposed remedy executor 19 for applying the proposed remedy extracted by the proposed remedy extractor 17 to the document being edited through the document editor 18. In the present embodiment, the proposed remedies displayed on the display 11 in the foregoing second embodiment of the second invention are sent from the proposed remedy extractor 17 to the proposed remedy executor 19.

The document editor 18 has the same document preparing/editing function as ordinary word processors, workstations and DTP systems; while the proposed remedy executor 19 performs such a document preparing/editing function to apply the extracted proposed remedies to the document held in the document memory 12. In general, the proposed remedy executor 19 depends deeply on the document editor 18. For example, when the paper size is set to be A4 Landscape and the lateral length of the printing face is set to be 170 mm, the left and right margins of the printing face are calculated to be 63 mm from the lateral length of the paper face so that the lateral length of the printing face becomes 170 mm. Assume that when data of "63 mm" is inputted to a memory of the document editor 18 to be designated respectively to the left and right margins of the printing face of the document and then a special processing known as the layout processing is executed, the lateral length of the printing face becomes 170 mm. Then the proposed remedy executor 19 has such a executing means as shown in FIG. 23. Similarly, when the lateral length of the printing face is set to be 170 mm and the document editor 18 has a means for setting the printing face of the document to be center with respect to the paper face, the proposed remedy executor 19 has such an executing means as shown in FIG. 24. The document data structure of the document memory 12 dependent on the document editor 18 such as the layout processing is summarized in a paper entitled "Experimental Generation of ODA Document Processing System" reported in Proceedings of the 37-th General Meeting of the Information Processing Society of Japan, 1X-1 to 1X-3, 1988.

In this way, the proposed remedy executor 19 has a means for causing the document editor 18 to perform its editing operation in such a manner that all the proposed remedies extracted by the proposed remedy extractor 17 are applied to the document held in the document memory 12. And when the aforementioned means executes all the proposed remedies received from the proposed remedy extractor 17, the document held in the document memory 12 is fully provided with all the proposed remedies.

A fourth embodiment of the second invention will be explained. Referring to FIG. 7, there is shown a block diagram of a document preparation support system in accordance with the fourth embodiment of the second invention. In the present embodiment, the knowledge database 13 shown in the foregoing first–third embodiments of the second invention is made up of a plurality of sub-databases 13-1, 13-2, . . . corresponding to the type, associated person, etc. of documents. Further provided in the fourth embodiment are an input part 20 for entering commands, etc. and a knowledge database selector 21 for selecting one of the plurality of sub-databases 13-1, 13-2, . . . on the basis of the input data received from the input part 20. Although the arrangement of FIG. 25 is based on the arrangement of FIG. 22, the arrangement of FIG. 7 may be similarly based on the arrangement of FIG. 14 or 20.

Reference has been made to the single database in the foregoing first–third embodiments of the second invention. In the present document preparation support system, however, the knowledge database selector 21 selects associated one from the plurality of knowledge databases according to the attribute data of, e.g., a technical document to retrieve the associated knowledge database. With such an arrangement, finer knowledge can be retrieved in a shorter time and thus the supporting effect can be enhanced. Further, since the knowledge database is divided into the plurality of sub-databases, specific one or ones of the plurality of sub-databases can be mounted on another system in some applications, whereby the database requiring a lot of labor and cost for its preparation and maintenance can be efficiently utilized.

As has been explained in the foregoing, in accordance with the document preparation support systems of the first invention have an advantage, since inference is carried out with use of such document data as document contents and attributes and such document design knowledge data as evaluation words and document design elements to determine the optimum document design, the document preparer can easily generate a good-looking document meeting his purpose and application while eliminating the need for having any editorial design knowledge.

Further, in accordance with the document preparation support systems of the second invention have an advantage, since inference is carried out with use of such document data as document contents and attributes and the improper point indication data indicative of improper points in the document to indicate the improper points in the document being prepared, even when the document preparer has no knowledge about how to reflect his purpose and application on the document, he can easily prepare a document having a good result and satisfying his purpose and application.

Accordingly, since the present invention can more finely support the document preparation than the prior art system for re-using the past documents or applying document formats, the supporting effect can be enhanced and the present invention can prepare such a document that can transmit the document preparer's information to the reader fully.

What is claimed is:

1. A document preparation support system wherein a document to be prepared and supported, which is a document being partially prepared or being under a preparation process, is modified to be a document having a nice-looking and optimal document design that satisfies an intention of a person who is preparing the document to be prepared and supported and that is suitable for a purpose of the document, comprising:

document data memory means for storing therein contents and attributes of the document to be prepared and supported, incidental data, selected from the group consisting of readability, clarity, impression and formality, said data being evaluation measures that indicate in a ranking format the intention of the person preparing the document to be prepared and supported or a finished impression of the document to be prepared and supported;

a knowledge database including a plurality of rules which are prepared based on document design knowledge and which leads out one or more satisfactory document design parameters for each data indicative of the document attributes and the incidental data; and document design deciding means for extracting the document attributes stored in said document data memory means and said incidental data, applying associated rules in the knowledge database to all of the extracted document attributes and the incidental data, performing inferring processing of combining one or more document design parameters let out from said applied rules, and determining a collection of the combined document design parameters as the optimal document design for the document to be prepared and supported.

2. A document preparation support system as set forth in claim 1, wherein said document to be prepared and supported is a structured document and said document design deciding means decides at least one of paper size, paper orientation, document margin, character size, typeface, offset, line pitch, the number of multiple columns, and color combinations, for entire structured document or for each of the logical structure constituting the structured document.

3. A document preparation support system as set forth in claim 1, further comprising first display means for displaying contents according to the document design decided by said document design deciding means.

4. A document preparation support system as set forth in claim 1, further comprising document design executing means and document editing means, wherein said document editing means edits the document stored in said document data memory means and said document design executing means applies the document design decided by said document design deciding means to said document to be prepared and supported through said document editing means.

5. A document preparation support system as set forth in claim 3, further comprising second display means and input means, wherein said second display means displays missing data necessary in said document design deciding means, and said input means inputs the missing data necessary in said document deciding means on the basis of a display of said second display means, the data inputted through said input means being stored into said document data memory means.

6. A document preparation support system as set forth in claim 1, further comprising a first and second knowledge databases and database selecting means, and wherein said database selecting means selects one of said first or second knowledge databases.

7. A document preparation support system wherein a document to be prepared and supported, which is a document being partially prepared or being under a preparation process, is modified to be a document having a nice-looking and an optimal document design that satisfies an intention of a person who is preparing the document to be prepared and supported and that is suitable for a purpose of the document, said document preparation support system comprising:

document data memory means for storing therein contents and attributes of the document to be prepared and supported, incidental data, selected from the group consisting of readability, clarity, impressions, formality, which is an evaluation measure that indicates in a ranking format the intention of the person preparing the document to be prepared and supported or a finished impression of the document to be prepared and supported, and document design parameters being currently set;

a knowledge database including a plurality of rules which are prepared based on a document design knowledge and which identifies improper contents of the document design parameters in the document design based on a correlationship among the currently set document design parameters, the document attributes and the incidental data; and improper content indicating means for storing the document attributes of the document to be prepared and supported in said document data memory means applying the rules, and indicating the identified improper contents in the document design.

8. A document preparation support system as set forth in claim 7, further comprising first display means for displaying contents indicated by said improper contents indicating means.

9. A document preparation support system as set forth in claim 7, further comprising at least a first and second knowledge databases and database selecting means, wherein said database selecting means selects one of said first and second knowledge databases.

10. A document preparation support system wherein a document to be prepared and supported, which is a document being partially prepared or being under a preparation process, is modified to be a document having a nice-looking and an optimal document design that satisfies an intention of a person who is preparing the document to be prepared and supported and that is suitable for a purpose of the document, said document preparation support system comprising:

document data memory means for storing therein contents and attributes of the document to be prepared and supported, evaluation measures selected from the group consisting of readability, clarity, impression and formality, said evaluation measures indicating in a ranking format the intention of the person preparing the document to be prepared and supported, a finished version of the document to be prepared and supported, and document design parameters being currently set;

a knowledge database including a plurality of rules containing a first rule which is prepared based on document design knowledge and which notes improper contents of the document design parameters in the document design based on a correlationship between any of the currently set document design parameters, the document attributes and the evaluation measures and a second rule which is prepared based on the document design knowledge and which notes proper contents of the document design parameters in the document design based on a correlationship between any of the improper contents in the document design, the document attributes and the evaluation measures; and proposed remedy extracting means for extracting from the document data memory means the document attributes of the document to be prepared and supported, the evaluation measures and the currently set document design parameters, indicating the improper contents of the document design parameters in the document design based on the first rule, applying the second rule to the indicated improper contents in any of the document design and the document attributes at this time and the evaluation measures, and extracting data which remedies the document design parameters having the improper contents in the document design into document design parameters of the proper contents.

11. A document preparation support system as set forth in claim 10, wherein the document to be prepared and supported is a structured document and said proposed remedy extracting means extracts data modifying at least one of paper size, paper orientation, document margin, character size, typeface, offset, line pitch, the number of multiple columns, and color combination, for an entire structured document or for each of the logical structure constituting the logical document.

12. A document preparation support system as set forth in claim 10, further comprising document editing means and proposed remedy executing means, wherein said document editing means re-edits the document to be prepared and supported which is being stored in said document data memory means and said proposed remedy executing means applies the one or more proposed remedies extracted by said proposed remedy extracting means to the document to be prepared and supported through said document editing means.

13. A document preparation support system as set forth in claim 10, further comprising second display means and input means, wherein said second display means displays missing data necessary in said proposed remedy extracting means, and said input means inputs the missing data necessary in said proposed remedy extracting means on the basis of a display of said second display means, the data inputted through said input means being stored in said document data memory means.

14. A document preparation support system as set forth in claim 10, further comprising at least a first and second knowledge databases and database selecting means, wherein said database selecting means selects one of said first and second knowledge databases.

* * * * *